United States Patent
Feller et al.

(10) Patent No.: US 9,378,302 B2
(45) Date of Patent: *Jun. 28, 2016

(54) ADJUSTING RANGES OF DIRECTED GRAPH ONTOLOGIES ACROSS MULTIPLE DIMENSIONS

(71) Applicant: INTERNATIONAL BUSINESS MACHINES CORPORATION, Armonk, NY (US)

(72) Inventors: John A. Feller, Cary, NC (US); John K. Gerken, III, Apex, NC (US); Lee M. Surprenant, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/635,067

(22) Filed: Mar. 2, 2015

(65) Prior Publication Data

US 2015/0347626 A1 Dec. 3, 2015

Related U.S. Application Data

(63) Continuation of application No. 14/294,236, filed on Jun. 3, 2014.

(51) Int. Cl.
*G06F 17/27* (2006.01)
*G06F 17/30* (2006.01)
*G06F 17/28* (2006.01)

(52) U.S. Cl.
CPC ...... *G06F 17/30958* (2013.01); *G06F 17/2735* (2013.01); *G06F 17/2785* (2013.01); *G06F 17/28* (2013.01); *G06F 17/30684* (2013.01); *G06F 17/30734* (2013.01); *G06F 17/274* (2013.01); *G06F 17/277* (2013.01); *G06F 17/2795* (2013.01)

(58) Field of Classification Search
USPC ............................................ 704/9, 10, 2, 3, 7
See application file for complete search history.

(56) References Cited

U.S. PATENT DOCUMENTS

| | | | |
|---|---|---|---|
| 7,225,183 B2 * | 5/2007 | Gardner | G06F 19/28 |
| 8,108,405 B2 | 1/2012 | Marvit et al. | |
| 8,533,140 B2 * | 9/2013 | Harashima | G06F 17/30684 704/9 |
| 2008/0071521 A1 * | 3/2008 | Larvet | G06F 17/274 704/9 |
| 2009/0094020 A1 | 4/2009 | Marvit et al. | |

(Continued)

OTHER PUBLICATIONS

List of IBM Patents or Patent Application Treated as Related—Apr. 16, 2015, pp. 1-2.

(Continued)

*Primary Examiner* — Vu B Hang
(74) *Attorney, Agent, or Firm* — Law Office of Jim Boice

(57) ABSTRACT

A method, system, and/or computer program product constructs and utilizes an ontological graph. A seed term and an expansion signal are received from a user. An ontological graph is constructed based on the expansion signal as applied to the seed term. The ontological graph includes nodes representing the seed term plus other terms that are located in accordance with instructions derived from the first expansion signal, such that the seed term and the other terms share a common trait. Terms from the ontological graph are displayed as string literals in a dictionary, wherein the dictionary contains related other terms at a resolution level that is controlled by the first expansion signal from the user and the seed term.

13 Claims, 4 Drawing Sheets

(56) References Cited

U.S. PATENT DOCUMENTS

| | | | |
|---|---|---|---|
| 2010/0030552 A1* | 2/2010 | Chen | G06F 17/30734 704/9 |
| 2010/0217742 A1 | 8/2010 | Labrou et al. | |
| 2012/0191716 A1 | 7/2012 | Omoigui | |
| 2013/0246049 A1* | 9/2013 | Mirhaji | G06F 17/30312 704/9 |

OTHER PUBLICATIONS

Anonymous, "Phylogenetic Tree App Reference", The Mathworks, Inc Mathworks.Com, Retrieved May 20, 2014, pp. 1-15.

P.L. Whetzel et al., "Systematized Nomenclature of Medicine—Clinical Terms (Tympanic Membrane Structure)" National Center for Biomedical Ontology, Retrieved May 20, 2014, pp. 1-14.

L. McDowell et al., "Ontology-Driven Information Extraction With Ontosyphon", Fifth International Semantic Web Conference (ISWC 2006) Nov. 5-9, 2006, Athens, Georgia, US, pp. 1-17.

The University of Sheffield, "Chapter 13: Gazetteers", Gate: General Architecture for Text Engineering, The University of Sheffield, Retrieved May 20, 2014, pp. 1-12.

* cited by examiner

ADJUSTING RANGES OF DIRECTED GRAPH ONTOLOGIES ACROSS MULTIPLE DIMENSIONS

BACKGROUND

The present disclosure relates to the field of computers, and specifically to the use of computers in evaluating data. Still more particularly, the present disclosure relates to ontologies used to evaluate data from documents.

To extract entities and concepts from unstructured text, approaches often build on predefined sets of terms packaged into "dictionaries". These dictionaries generally hold a collection of like terms such as names or places, or any other word or phrase of interest. Construction of such dictionaries often involves manual entries of terms, which is laborious, time consuming, and error-prone.

SUMMARY

A method, system, and/or computer program product constructs and utilizes an ontological graph. A seed term and an expansion signal are received from a user. An ontological graph is constructed based on the expansion signal as applied to the seed term. The ontological graph includes nodes representing the seed term plus other terms that are located in accordance with instructions derived from the first expansion signal, such that the seed term and the other terms share a common trait. Terms from the ontological graph are displayed as string literals in a dictionary, wherein the dictionary contains related other terms at a resolution level that is controlled by the first expansion signal from the user and the seed term.

DETAILED DESCRIPTION

Figure 1:
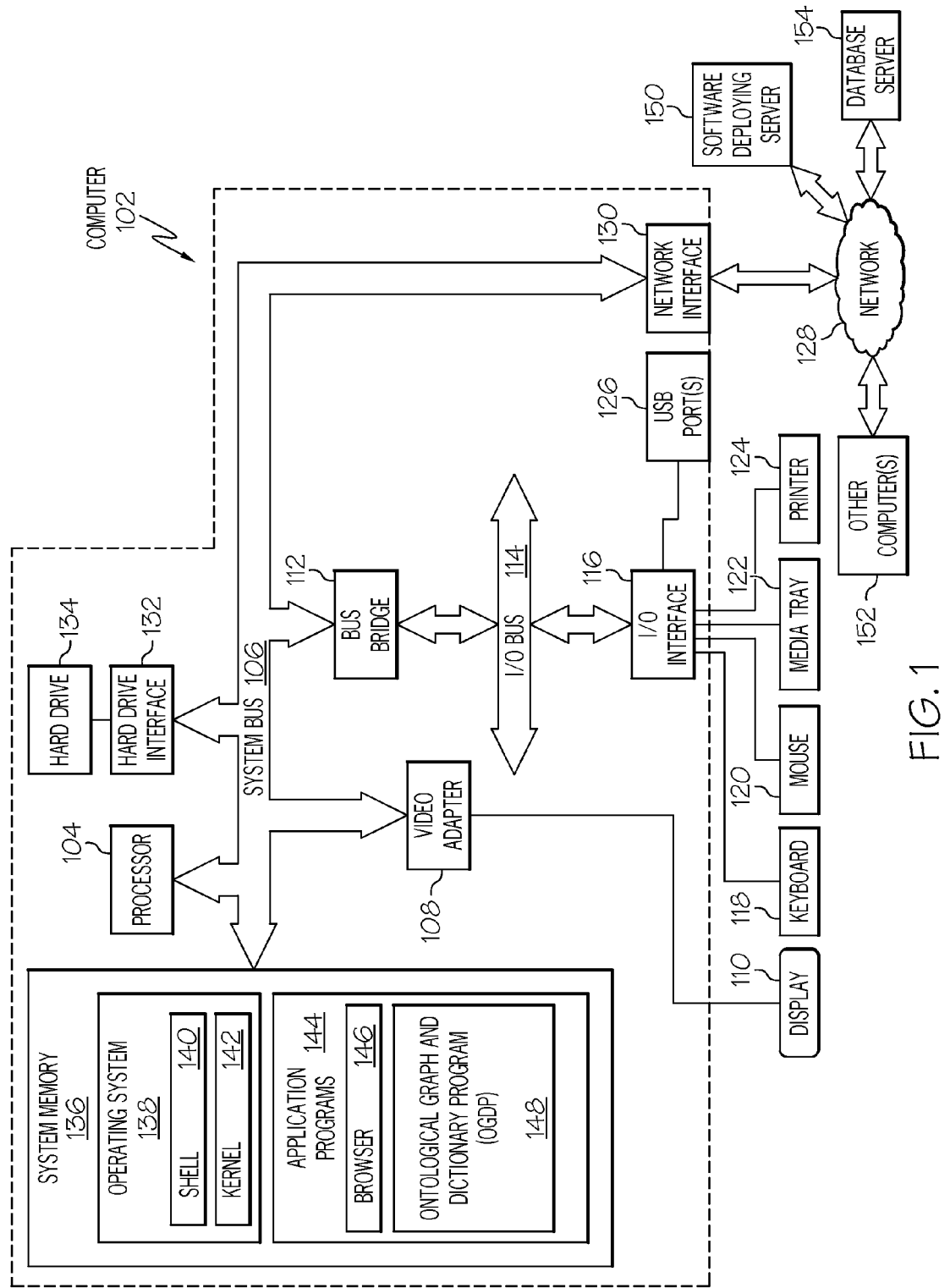
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152 and/or a documents/database server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Ontological Graph and Dictionary Program (OGDP) 148. OGDP 148 includes code for implementing the processes described below, including those described in FIGS. 2-4. In one embodiment, computer 102 is able to download OGDP 148 from software deploying server 150, including in an on-demand basis, wherein the code in OGDP 148 is not downloaded until needed for execution. Note further that, in one embodiment of the present invention, software deploying server 150 performs all of the functions associated with the present invention (including execution of OGDP 148), thus freeing computer 102 from having to use its own internal computing resources to execute OGDP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
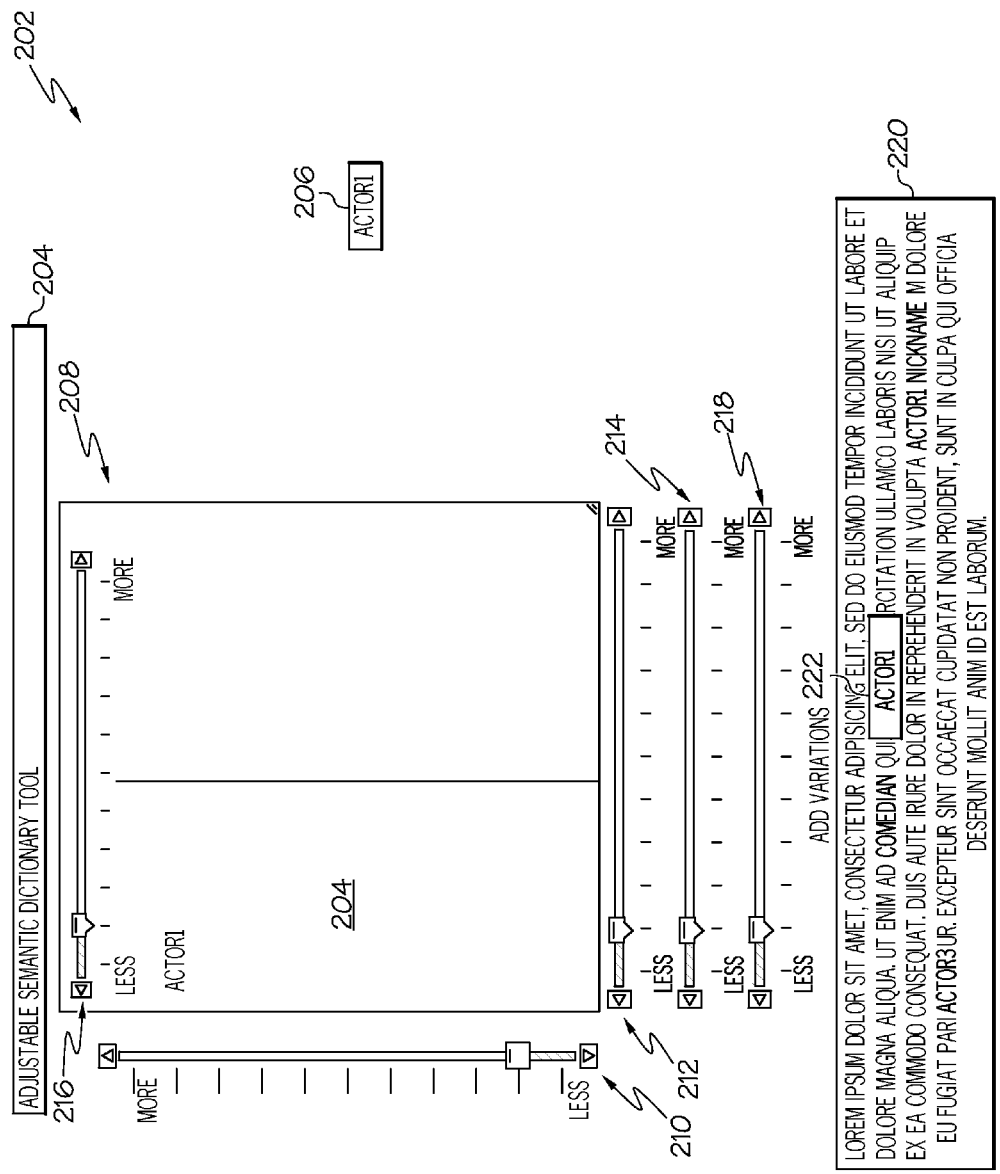
FIG. 2 illustrates a user interface (UI) for an adjustable semantic dictionary tool in accordance with one or more embodiments of the present invention.

With reference now to FIG. 2, a user interface (UI) 202 for an adjustable semantic dictionary tool (ASDT) 204 is presented. In one embodiment, ASDT 204 is a component of the application program OGDP 148 shown in FIG. 1. ASDT 204 may run on a server (e.g., computer 102 shown in FIG. 1), or ASDT 204 may run on a client (e.g., one or the other computer(s) 152 shown in FIG. 1). Likewise, the UI 202 may be on a display (e.g., display 110 shown in FIG. 1) for a server, or UI 202 may be on a display (e.g., display 110 shown in FIG. 1) for a client.

Whether on a server or a client, the UI 202 includes a text entry field 205, which is a normal text entry field. As shown for exemplary purposes, assume that a user has typed in the name of a particular actor, named "Actor1". Note further that all of the slider bars (details of which are presented below) are set initially at their lowest settings.

The user's entry of "Actor1" into text entry field 205 results in a single node 206 being generated (and optionally displayed, as shown in FIG. 2). As there is only one node 206, there is no "graph", ontological or otherwise, that has been constructed, displayed to the user, and/or otherwise utilized. Similarly, there is only one entry ("Actor1") in a dictionary 208, which is initially created when the user entered the name "Actor1" in the text entry field 205.

However, as described in detail below, the present invention will accept the user's typed entry of "Actor1" as a "seed term" for generating an ontological graph starting with the resulting node 206. That is, from this "seed term", the present invention is able to generate and utilize an expanded ontological graph.

For purposes of the present invention, an "ontological graph" (also known as an "ontology chart") is defined as a graphical representation of the ontology of related terms. For purposes of the present invention, "ontology" is defined as a hierarchical relationship between related terms based on types, properties, and interrelationships shared by related terms. Each term in an ontological graph is represented by a node. For example, a parent node may represent the term "fruit", and its child nodes may represent the related terms "apple", "orange", and "pear", all of which are "fruit". A parent node that is not a child to any other node is known as the root node. A child node that has no children of its own is known as a leaf node. An exemplary ontological chart is a tree chart, in which each parent node has one or more child nodes, where each child node shares a common attribute (type, property, interrelationship) that is defined by the parent node.

Returning now to FIG. 2, note again that no ontological chart has been generated and/or displayed to the user yet. As described herein, however, when a user changes settings to sliders 210, 212, 214, 216, and 218 from their lowest settings to higher settings, an ontological chart and resulting dictionary will automatically be generated. This ontological chart and/or resulting dictionary may be used in text analysis, including natural language processing (NLP) text analysis.

Assume then, for exemplary purposes, that dictionary 208 is a natural language processing (NLP) dictionary being used in an NLP text analysis. An NLP text analysis examines a set of text (e.g., in a document) in order to derive a contextual meaning of terms found in the document, and/or to determine a scope, field, and/or topic of the document. Thus, if the user is using dictionary 208 as an NLP dictionary to search for terms in a document 220, only "Actor1" will be identified, as shown in highlight 222. That is, the NLP text analysis will only be able determine that document 220 is about "Actor1", and no other conclusion is derived from the NLP text analysis. However, by moving one or more of the sliders 210, 212, 214, 216, and 218 to a higher setting, the present invention generates a true ontological graph, from which an expanded dictionary is generated, thus enabling a more substantial NLP text analysis.

Figure 3:
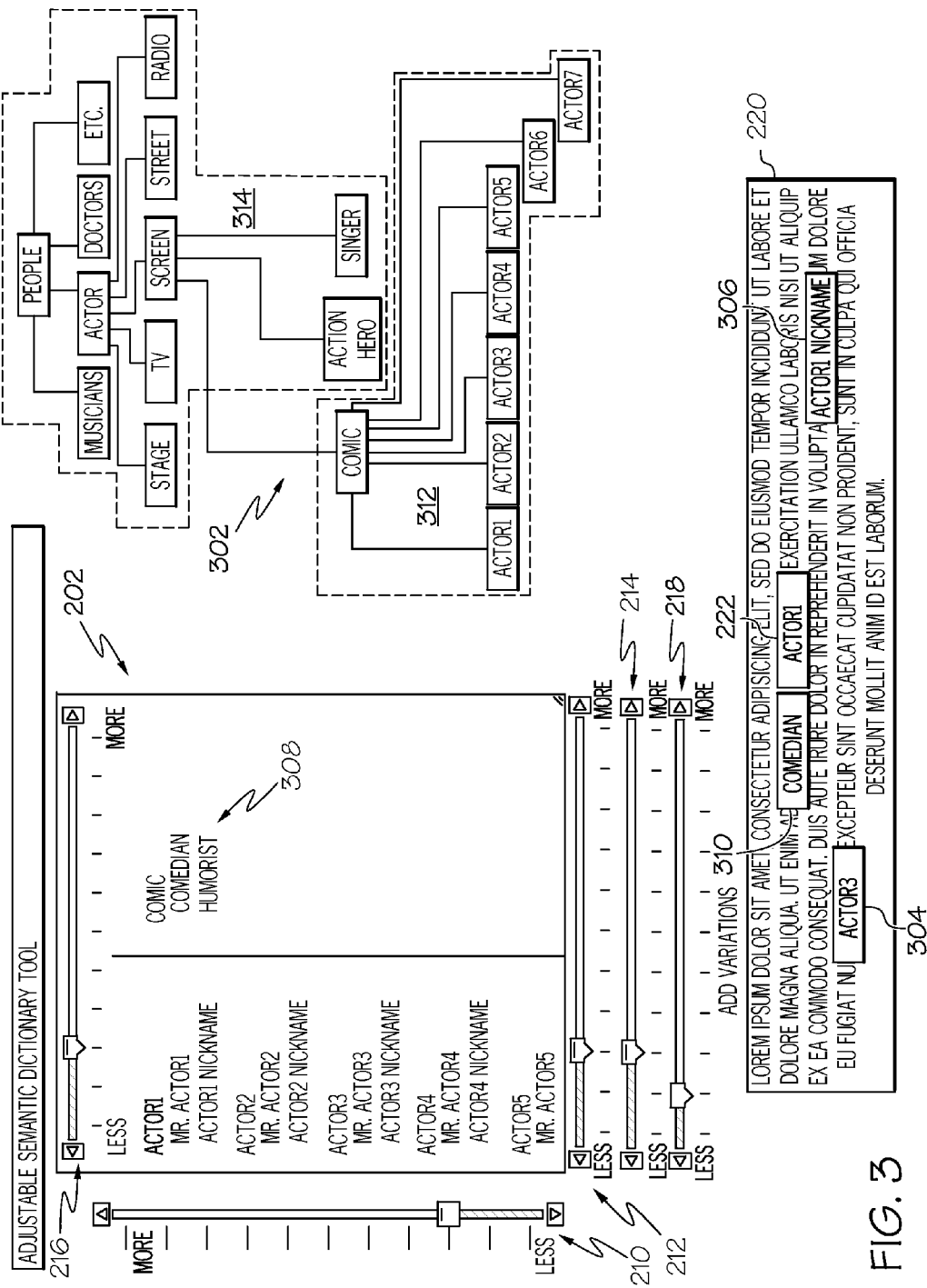
FIG. 3 depicts a further embodiment of the UI for an adjustable semantic dictionary tool illustrated in FIG. 2.

With reference then to FIG. 3, assume first that the user has moved slider 210 to the higher level as shown. This user action causes two results. First, additional nodes are identified for the ontological graph 302. That is, besides the seed term/node for "Actor1", other related terms/nodes for "Actor2", "Actor3", "Actor4", "Actor5", "Actor6", and "Actor7" now populate ontological graph 302. Second, the terms represented by these nodes (for "Actor2", "Actor3", "Actor4", "Actor5", "Actor6", and "Actor7") now populate the expanded dictionary 308, which has been expanded from the original dictionary 208 shown in FIG. 2. Thus, when using the expanded dictionary 308 as an NLP dictionary (for an NLP text analysis of document 220), "Actor3" is also identified, as demonstrated by highlighted field 304. Thus, the NLP analysis now knows that document 220 is about "Actor1" as well as "Actor3".

Note that other entries besides "Actor2", "Actor3", "Actor4", "Actor5", "Actor6", and "Actor7" also are now in the expanded dictionary 308. This is because the user has also moved the slider 212 to a higher position. Slider 212 causes related terms for "Actor1", "Actor2", "Actor3", "Actor4", "Actor5", "Actor6", and "Actor7" to also populate the expanded dictionary 308. For example, the related terms "Mr. Actor1" and "Actor1 nickname" are other names that "Actor1" goes by, and thus are related terms. As shown in highlighted field 306 in document 220, "Actor1 nickname" is identified and highlighted, such that the NLP analysis now knows that document 220 is also about "Actor1 nickname". In one embodiment, terms such as "Mr. Actor1" and "Actor1 nickname" are not part of the ontological graph 302, but rather are derived from a label that is associated with a term/node. For example, a Resource Description Framework (RDF) class object may provide pseudonyms/synonyms/nicknames (e.g., "Mr. Actor1") of a term/node in an "rdf: label" class that is associated with a particular node in the ontological graph 302. Alternatively, such information may be defined as a value of a label or relationship such as that defined by a Simple Knowledge Organization System (SKOS) entry built upon RDF. SKOS provides access to vocabularies through specific labels (e.g., "skos:altLabel") or relationships ("skos:related), which respectively will retrieve labels/names (e.g., "Mr. Actor1") that are associated with the term/node (e.g., "Actor1").

Note further that the expanded dictionary 308 also includes a text entry for "Comic". As shown in the ontological graph 302, "Comic" is from a parent node to the node representing the seed node (for "Actor1") as well as the related nodes for "Actor2", "Actor3", "Actor4", "Actor5", "Actor6", and "Actor7". This expansion of the dictionary 308 was caused by the user moving the slider 214 to the next higher level, which controls how far upwards the ontological graph 302 will be expanded. That is, if the user had moved the slider 214 even further to the right, then the ontological graph 302 would include nodes for "Screen", "Actors", and/or even "People".

Note further that the expanded dictionary 308 also includes a text entry for "Comedian" and "Humorist", both of which are related terms for "Comic". These terms appear in the expanded dictionary 308 due to the user moving the slider 216 to the right, causing the population of more related terms for the parent node ("Comic"). As shown in document 220, this results in the NLP analysis also identifying the term "comedian", as shown in the highlighted field 310. As with the discussion above related to the terms "Mr. Actor1" and "Actor1 nickname", note that additional nodes for "Comedian" and "Humorist" are not shown in the ontological graph 302. In one embodiment these terms are secondary child nodes of the node "Comic" shown in the ontological graph 302.

Note that the slider 218 has been left at its lowest setting. Slider 218 causes the system to include sibling nodes to the parent node to be added or removed. That is, assume that the parent node is for "Comic", as shown in FIG. 3. Assume further that there are also terms that would result in the creation of nodes that represent "Action hero" and "Singer" as other types of "Screen" "Actors". Moving the slider 218 to the right would thus locate, generate, and/or display the nodes/terms for "Action hero" and "Singer", as types of screen actors, and auto-populate the expanded dictionary 308 accordingly.

Thus, the present invention allows a user, who may have little or no knowledge of how a text analysis (including an NLP text analysis) of documents works, to construct an ontological graph and/or related dictionary. However, the user is immediately able to 1) see the string literals (i.e., entries in the expanded dictionary 308) generated by movements of the sliders; 2) how the string literals relates to nodes in the ontological graph 302; and/or 3) how changes to the expanded dictionary 308 result in newly highlighted terms in a particular document, such as document 220.

Several embodiments are possible for generating the ontological graph 302 as well as the expanded dictionary 308 from the initial seed term "Actor1". In one embodiment, "Actor1" is simply found in a pre-existing dictionary and/or ontological graph found in a database server, such as documents/database server 154 shown in FIG. 1. Thus, as the user moves one or more of the sliders 210, 212, 214, 216, and 218, more or less of the pre-existing dictionary and/or ontological graph is retrieved and/or displayed. Thus, in the settings for the sliders 210, 212, 214, 216, and 218 are as shown in FIG. 3, then only portion 312 of the ontological graph 302 is shown, and only terms from the nodes in portion 312 will populate the expanded dictionary 308. Terms from nodes in portion 314 of the ontological graph 302, which may or may not exist, are not shown to the user on the UI 202, and will not cause additional terms (e.g., "Screen", "Actor", etc.) to populate the expanded dictionary 308.

In a preferred embodiment, however, moving the sliders 210, 212, 214, 216, and 218 actually generates the ontological graph 302 at selected levels of complexity through data mining, including the use of metatags. For example, assume that the seed term "Actor1" also includes a metatag (provided by the user or found in another database) called "comic", which indicates that "Actor1" is a comic actor. This metatag allows the system to data mine databases, websites, etc. to find other actors whose names have been tagged with the same/equivalent metatag "comic". This data mining allows not only the other actors ("Actor2", "Actor3", etc.) to be identified, but also enables the identification/retrieval of the parent term/node for "Comic".

In one embodiment, if the terms are not proper nouns (i.e., names of specific persons, places, etc.), but rather are merely common nouns (i.e., generic terms), then a simple dictionary of meanings and synonyms of the terms can be used to construct the ontological graph 302. For example, if the "comic" node in ontological graph 302 was actually a "fruit" node, then any child node could easily be identified in a simple dictionary by locating any common noun (e.g., "apple", "pear", etc.) for a "fruit".

Figure 4:
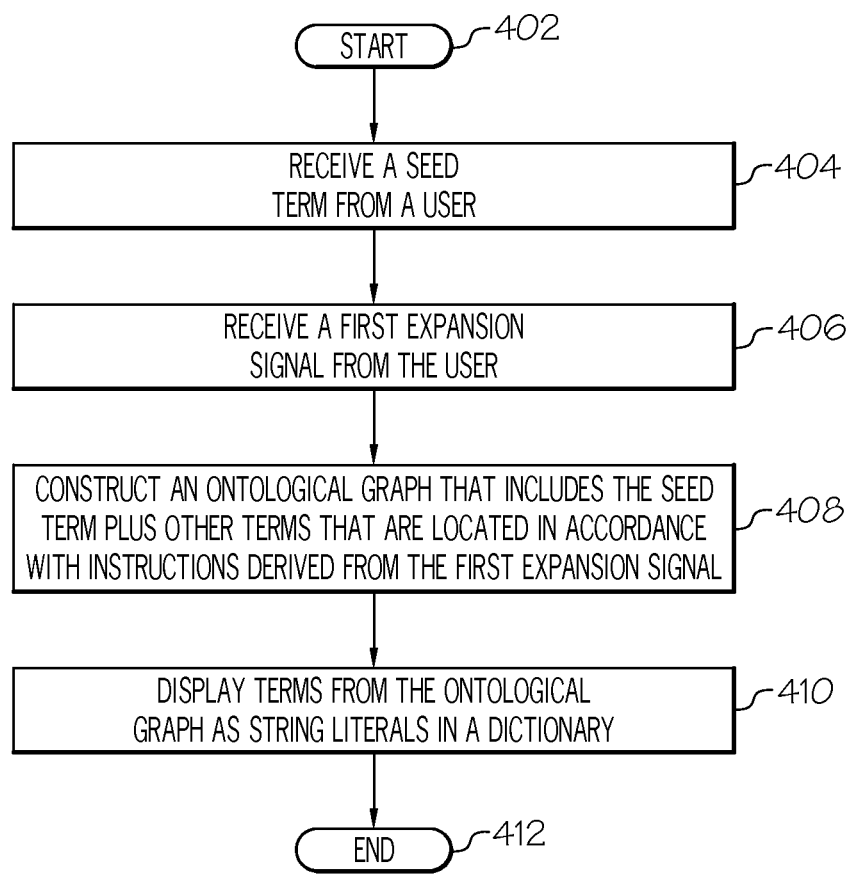
FIG. 4 is a high-level flowchart of one or more steps performed by one or more processors to construct and utilize ontological graphs.

With respect now to FIG. 4, a high-level flowchart of one or more steps performed by one or more processors to construct and utilize ontological graphs is presented. After initiator block 402, a seed term is received from a user (block 404). For example, the system may receive an initial term "Actor1" as described above.

As described in block 406, the system then receives a first expansion signal from the user, such as the user moving the slider 210 to a higher position, as shown in FIG. 3.

As described in block 408, the system then constructs an ontological graph (e.g., ontological graph 302 shown in FIG. 3) that includes nodes representing the seed term ("Actor1) plus other terms ("Actor2", "Actor3", "Actor4", etc.). These other nodes/terms are located in accordance with instructions derived from the first expansion signal. That is, if the first expansion signal is a movement of the slider 210 to a higher level, the system interprets this movement/signal as an instruction to expand the ontological graph with nodes representing terms that are related to the seed term, both of which share a common trait (e.g., are all "comic actors", as shown in FIG. 3).

As described in block 410, the system then displays terms from the ontological graph as string literals in a dictionary (as shown in FIG. 3). Note that this now "expanded dictionary" contains related other terms at a resolution level that is controlled by the first expansion signal from the user and the seed term. That is, based on what the seed term was (e.g., "Actor1") and how much the slider 210 has been moved, a particular ontological graph and/or dictionary will be generated using the process described herein.

The flow chart ends at terminator block 412.

In one embodiment of the present invention, the method further comprises receiving a second expansion signal (e.g., from a movement of slider 212 as shown in FIG. 3) from the user. This signal/movement results in an expansion of the dictionary to include related terms for at least one of the terms from the ontological graph. As described herein, these related terms describe at least one of the terms from the ontological graph, such that the dictionary is expanded to include the related terms in accordance with instructions derived from the second expansion signal.

In one embodiment of the present invention, the method further comprises receiving a third expansion signal (e.g., from movement of slider 214 shown in FIG. 3) from the user. This third signal/movement causes the system to expand the dictionary to include a parent term of at least one of the terms from the ontological graph. As discussed herein, this parent term includes a term that describes the common trait shared by the seed term and its related terms. Thus, the dictionary is expanded to include the related terms in accordance with instructions derived from the third expansion signal.

In one embodiment of the present invention, the method further comprises receiving a fourth expansion signal (e.g., from movement of the slider 308 shown in FIG. 3) from the user. This fourth expansion signal causes the system to expand the dictionary to include related parent terms for the parent term, wherein the related parent terms describe the parent term, and wherein the dictionary is expanded to include the related parent terms in accordance with instructions derived from the fourth expansion signal.

In one embodiment of the present invention, the ontological graph comprises levels that extend beyond that of the parent term. For example, the ontological graph 302 shown in FIG. 3, includes both regions 312 and 314. In this embodiment, the method further comprises restricting a view of the ontological graph to that below the parent term (as depicted in FIG. 3). In one embodiment, this view restriction is controlled by instructions derived from (e.g., within) the third expansion signal.

In one embodiment of the present invention, the method further comprises receiving a contraction signal from the user. That is, assume that after the ontological graph 302 has been generated as shown in FIG. 3, the user wants to contract (e.g., make smaller; less expansive) the ontological graph 302. Thus, sliding any of the sliders 210, 212, 214, 216, and/or 218 will cause the ontological graph 302 to be reduced, and thus entries are removed from the previously expanded dictionary 308. That is, instructions derived from the contraction signal removes one or more of the other terms from the ontological graph.

In one embodiment of the present invention, the method further comprises determining the common trait based on a frequency of use within a predefined set of documents, where terms that are found within the predefined set of documents at a same frequency of use share the common trait. For example, assume that a text analysis is being performed on 100 documents (e.g., a predefined set of documents from a database server such as documents/database server 154 shown in FIG. 1), and that the terms "Actor1", "Actor2", and "Actor3" are found at least once in each of these 100 documents. A determination is thus made that the terms "Actor1", "Actor2", and "Actor3" share a common trait, purely based on the fact that they are all found in these 100 documents.

In one embodiment of the present invention, the method further comprises receiving a topic selection signal, wherein the topic selection signal describes one or more topics that are selected by the user. The ontological graph and the dictionary are thus expanded to include terms related to the one or more topics that are selected by the user. For example, assume that a user enters the topics "comic actors" and "action hero actors" as topics that he/she is interested in using when performing a text analysis of documents. The system will then expand the ontological graph to cause the dictionary to include terms related to "comic actors" and "action hero actors", thus allowing an NLP text analysis to include these topics/terms.

In one embodiment of the present invention, the method further comprises identifying a common topic of a predefined set of documents, and then determining the common trait that is shared between the seed term and the other terms based on the common topic of the predefined set of documents. These terms, found within all of the predefined set of documents, are deemed to share the common trait. For example, assume that there are 100 documents, and in the title of all of the documents is the term "actor". A conclusion is reached that all 100 documents are related to the field of actors, and thus share the common topic of "actors". Thus, any term that is found in all 100 documents will be assumed to be related to "actors", even if the terms themselves initially do not appear to be so. That is, assume that all 100 documents include the terms "banker" and "toys". Initially, there is nothing to indicate that these terms have anything to do with actors, and thus the topic "actors" is not initially considered to be a common trait of "banker" and "toys". However, since the term "actor" is found in the title of all 100 documents, and the terms "banker" and "toys" are found in all 100 documents, then a conclusion is reached that the common trait of "banker" and "toys" actually is that they are related to "actors", based purely on this correlation.

In one embodiment of the present invention, the method further comprises determining the common trait that is shared between the seed term and the other terms based on terms that are synonyms, wherein terms that are synonyms are deemed to share the common trait. That is, if three terms are synonyms (e.g., "comic", "comedian", "humorist"), then these three terms share the common trait of being related to describing a person who tells jokes, acts in comedies, etc.

In one embodiment of the present invention, the seed term is used in a document. The method in this embodiment further comprises determining a context of the seed term within the document, and then identifying the common trait shared by the seed term and the other terms based on the context of the seed term within the document. For example, assume that the seed term is "prop", which is found in a particular document. Without a contextual examination, "prop" may refer to an aviation propeller (aircraft), a marine propeller (boats), a support for a construction (buildings), part of a theatrical set (plays), etc. Based on the context of the term "prop" within this particular document however, a determination is made that "prop" refers to a component of a theater set. Thus, the ontological graph (and corresponding dictionary) are populated with nodes/terms related to the theater (and actors).

In one embodiment of the present invention, the ontological graph is a natural language processing (NLP) ontological graph and the dictionary is a NLP dictionary used in an NLP analysis of text. The NLP analysis of text identifies specific terms according to a contextual meaning of the specific terms within the text. Thus, in this embodiment the method further comprises searching a text document for string literals found in the NLP dictionary, and then displaying and highlighting string literals, from the NLP dictionary, that are found in the text document. In order to explain the context of the embodiment, consider the following usage of NLP dictionaries.

In order to extract entities and concepts from unstructured text, approaches often build on predefined sets of terms packaged into "NLP dictionaries", also known simply as "dictionaries". These dictionaries generally hold a collection of like terms such as names or places, or any other word or phrase of interest. Oftentimes, such dictionaries contain too many entries, which lead to junk annotations that complicate the NLP model and reduce precision. Conversely, too few entries can result in coverage gaps, reducing recall and discovery. In addition, ontologies may be related such that each ontology represents a different dimension that the user may wish to include or exclude from their dictionary. Lastly, it is also recognized that where dictionaries are concerned, one size does not fit all, which reduces the reusable nature of existing assets. For instance, the document type being analyzed has a significant effect on the variability required in the dictionaries used for a given project. Thus, an exemplary NLP analysis in accordance with the present invention may follow the following process.

First, the user identifies a corpus of documents to be processed.

Next, the user begins to build an NLP model, identifying snippets of text that she would like to extract information from. Where the user identifies a useful set of terms as being "similar" that she would like to use as a building block for her model, she begins a new dictionary for the concept by selection, right-click, or dragging to create a "new dictionary by example". In one embodiment, terms manually added in this way are given a flag so that they will not be auto-removed; they can only be removed manually.

Finally, the user is presented with a vertical slider widget for "Type selection", in which the user indicates the types that she would like to include in the dictionary. This dialogue is generated based on information from the configured ontology and, in the preferred embodiment, a "type counting" algorithm that counts the number/quantity of seed terms which are "linked" to the given type. Adjusting the slider to select a different type is updated to add or remove terms, so that the list contains instances and subclasses of the selected types in the form of new entries.

As described herein, the user is presented with one or more sliders, knobs, or other control instrumentation interfaces to shrink or expand the list of surface forms included in the dictionary. The user is thus able to slide the dictionary between less (left/down) and more (right/up). For example, sliders can be associated with one or more of the following: synonyms; additional languages (i.e., words that mean the same thing in different languages); disambiguations (i.e., terms that clarify the meaning of a term); nicknames; etc. Whenever a slider is adjusted, the updated dictionary is run against the index of test documents, providing near-real-time feedback via a snapshot of "hits".

Thus, as presented herein, a system and method allows a user to select dictionaries terms to be used in such areas as NLP analytics, to select terms to be used in a search process, or for general graph exploration. The presented invention improves efficiency and allows users to select a range of terms contained within an ontology. The user interface presented herein allows a user to understand what is in an ontology by viewing literal strings, and to explore data in an incremental basis by expanding or contracting dictionary lists.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for constructing and utilizing an ontological graph, the method comprising:
   receiving, by one or more processors, a seed term from a user;
   receiving, by one or more processors, a first expansion signal from the user;
   constructing, by one or more processors, an ontological graph that includes nodes representing the seed term plus other terms that are located in accordance with instructions derived from the first expansion signal, wherein the seed term and the other terms share a common trait; and
   displaying, by one or more processors, terms from the ontological graph as string literals in a dictionary, wherein the dictionary contains related other terms at a resolution level that is controlled by the first expansion signal from the user and the seed term, wherein the first expansion signal causes additional nodes to be identified for the ontological graph, wherein the dictionary is an original dictionary that contains the seed term, wherein the first expansion signal further causes terms represented by the additional nodes to populate an expanded dictionary, and wherein the expanded dictionary is expanded from the original dictionary in which the seed term was located.

2. The method of claim 1, further comprising:
   receiving, by one or more processors, a second expansion signal from the user; and
   expanding, by one or more processors, the dictionary to include related terms for at least one of said terms from the ontological graph, wherein the related terms describe said at least one of said terms from the ontological graph, and wherein the dictionary is expanded to include the related terms in accordance with instructions derived from the second expansion signal.

3. The method of claim 2, further comprising:
   receiving, by one or more processors, a third expansion signal from the user; and
   expanding, by one or more processors, the dictionary to include a parent term of at least one of said terms from the ontological graph, wherein the parent term includes a term that describes the common trait, and wherein the dictionary is expanded to include the related terms in accordance with instructions derived from the third expansion signal.

4. The method of claim 3, further comprising:
   receiving, by one or more processors, a fourth expansion signal from the user; and
   expanding, by one or more processors, the dictionary to include related parent terms for the parent term, wherein the related parent terms describe the parent term, and wherein the dictionary is expanded to include the related parent terms in accordance with instructions derived from the fourth expansion signal.

5. The method of claim 3, wherein the ontological graph comprises levels that extend beyond that of the parent term, and wherein the method further comprises:
   restricting, by one or more processors, a view of the ontological graph to nodes below the parent term, wherein said restricting the view is in accordance with instructions derived from the third expansion signal.

6. The method of claim 1, further comprising:
   determining, by one or more processors, the common trait based on a frequency of use within a predefined set of documents, wherein terms that are found within the predefined set of documents at a same frequency of use share the common trait.

7. The method of claim 1, further comprising:
   receiving, by one or more processors, a topic selection signal, wherein the topic selection signal describes one or more topics that are selected by the user; and
   expanding, by one or more processors, the ontological graph and the dictionary to include terms related to the one or more topics that are selected by the user.

8. The method of claim 1, further comprising:
   identifying, by one or more processors, a common topic of a predefined set of documents; and
   determining, by one or more processors, the common trait that is shared between the seed term and the other terms based on the common topic of the predefined set of documents, wherein terms that are found within all of the predefined set of documents are deemed to share the common trait.

9. The method of claim 1, further comprising:
   determining, by one or more processors, the common trait that is shared between the seed term and the other terms based on terms that are synonyms, wherein terms that are synonyms are deemed to share the common trait.

10. The method of claim 1, wherein the seed term is used in a document, and wherein the method further comprises:
    determining, by one or more processors, a context of the seed term within the document; and identifying, by one or more processors, the common trait shared by the seed term and the other terms based on the context of the seed term within the document.

11. The method of claim 1, wherein the ontological graph is a natural language processing (NLP) ontological graph and the dictionary is a NLP dictionary used in an NLP analysis of text, wherein the NLP analysis of text identifies specific terms according to a contextual meaning of the specific terms within the text, and wherein the method further comprises:

searching, by one or more processors, a text document for string literals found in the NLP dictionary; and displaying and highlighting, by one or more processors, string literals, from the NLP dictionary, that are found in the text document.

12. The method of claim 4, wherein the first expansion signal is received from a first user input widget on a user interface, wherein the second expansion signal is received from a second user input widget on the user interface, wherein the third expansion signal is received from a third user input widget on the user interface, and wherein the fourth expansion signal is received from a fourth user input widget on the user interface.

13. The method of claim 12, wherein the first user input widget, the second user input widget, the third user input widget, and the fourth user input widget are slider bars on the user interface.

\* \* \* \* \*